July 28, 1964
R. H. VETTER
3,142,223
PROCESS AND CAMERA SYSTEM FOR SECURING
AND DISPLAYING A VERY WIDE-ANGLE IMAGE
Filed May 12, 1960
2 Sheets-Sheet 2
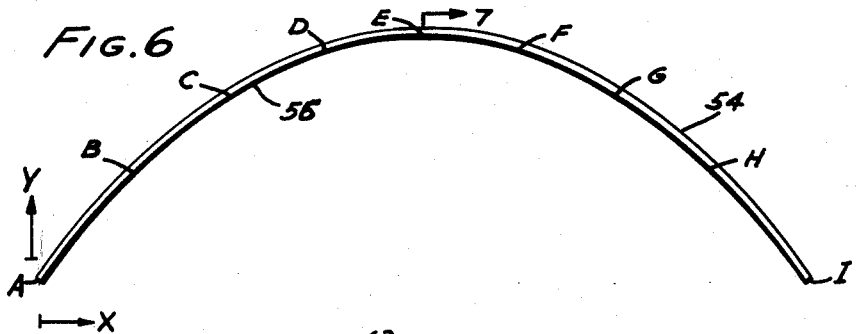
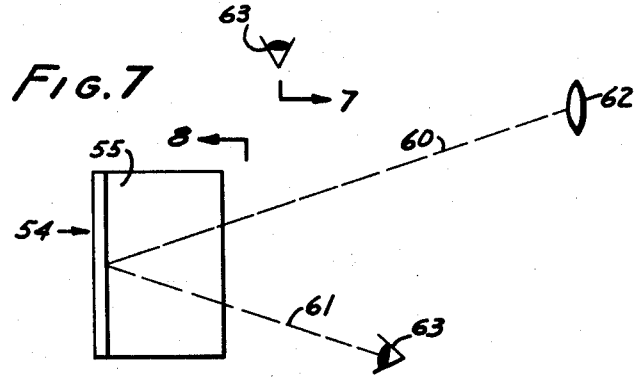
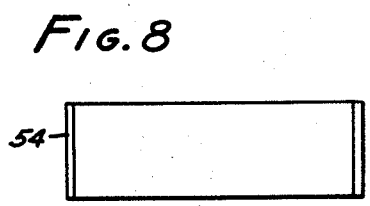
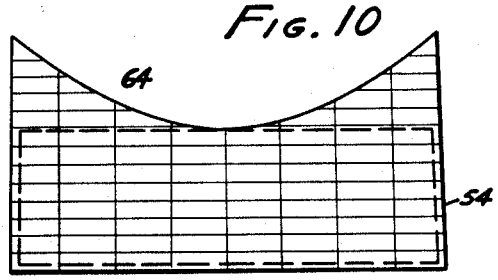
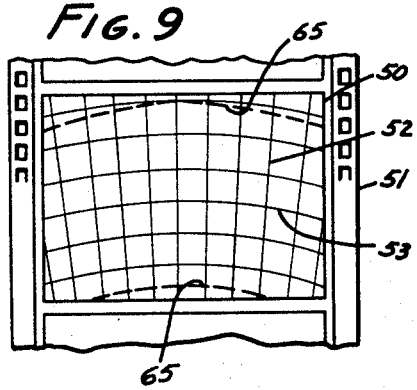
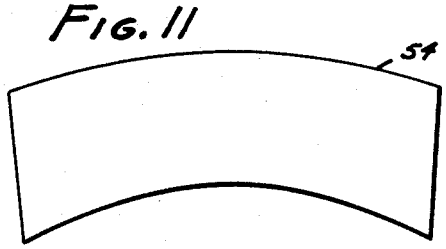
INVENTOR.
RICHARD H. VETTER
BY
Angus & Mon
ATTORNEYS.

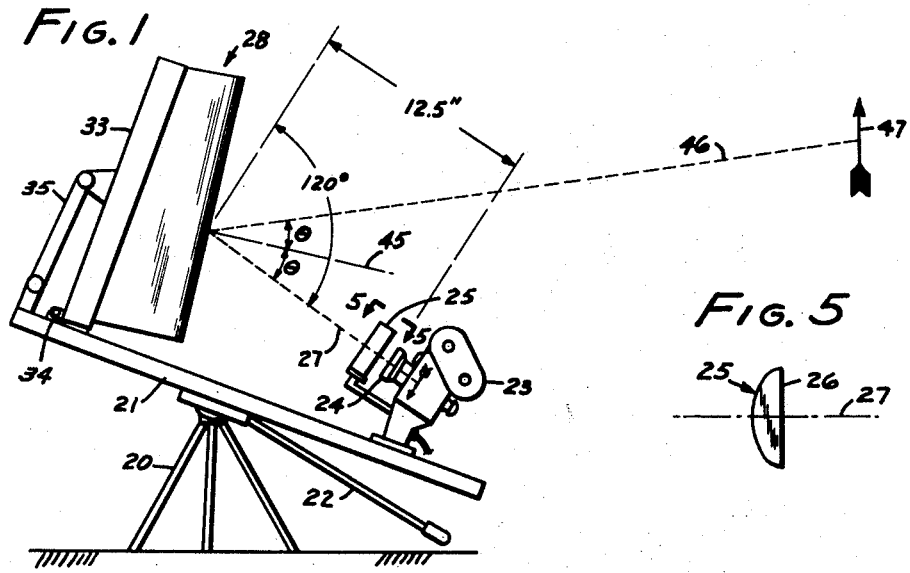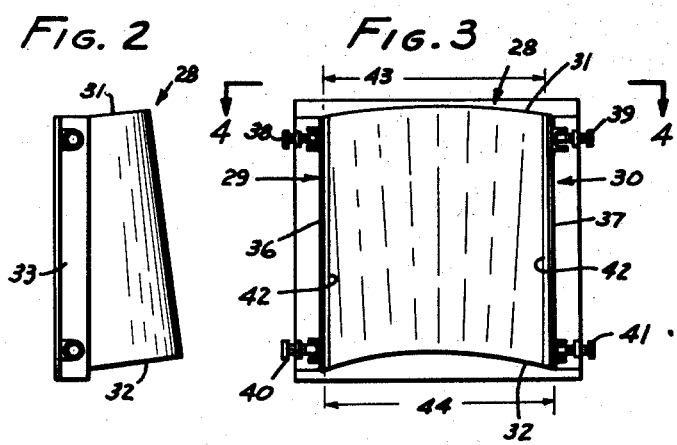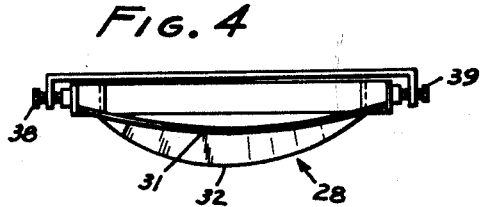

3,142,223
PROCESS AND CAMERA SYSTEM FOR SECURING AND DISPLAYING A VERY WIDE-ANGLE IMAGE
Richard H. Vetter, 10966 Strathmore Drive, Apt. 4, Los Angeles, Calif.
Filed May 12, 1960, Ser. No. 28,703
6 Claims. (Cl. 88—16)

This invention relates to a process for photographing and projecting a very wide field image representing those central and peripheral portions of visual imagery which are normally perceived in human binocular vision. The process can be utilized for both still and motion pictures.

This application is a continuation-in-part of applicant's copending patent application, Serial No. 788,811, filed January 26, 1959, entitled "Photographic and Projection Process," now abandoned.

The term "very wide field" as used herein relates to subtended angles greater than 130°. Ordinary wide angle subtense is of the order of 100°. The subtended angles to which this invention relates are greater than 130°, and may be as great as 180°. However, about 150° is usually adequate for theatrical display, and is the preferred angular subtense for the invention. Such large angles include not only the central portions of the imagery, but also the peripheral portions.

Previously-known processes for photographing and presenting very wide fields have fallen into one of two primary classes: (1) those processes which use a plurality of cameras to produce a plurality of films, and which use a plurality of projectors to project the films simultaneously and side by side to reconstitute a wide field; and (2) those employing a single lens of extremely short focal length and of spherical design. Type (1) processes are stringently limited by the high cost of producing and exhibiting the plurality of films. Also, they suffer from the inherent distortions of parallax, from color imbalance between the plurality of films and from the inability of the process to register on the screen several images so as to constitute a stable, homogeneous, and continuous field. Generally there are at least two bothersome "seams" in prominent positions in the projected image.

Type (2) processes are seriously limited in their applications, due to the fact that only a few spectators, who are placed at the center of the radius of projection, may view the image on the screen without extreme distortion. These processes are further limited because they vignette the image, and because they have poor resolution and low screen illumination. These disadvantages are all inherent in short lens designs.

The previously-known cinematographic systems which have been devised to photograph and project very wide fields have thus left much to be desired in terms of the economics of producing and displaying them, and of the overall effectiveness of the illusion presented. Up to the present time, no cinematographic process has been able to register on a single film an image which can be projected from a single projector to produce a continuous, homogeneous image over a very wide angle which can utilize existing projectors and theaters, and simultaneously provide a good illusion of presence to an audience spread out over a considerable area.

This invention comprises a third and completely different class of cinematographic process. It departs completely from previously accepted and standard concepts of wide-angle photography. These concepts have in themselves served to retard the art, because when they are complied with, it is necessary to use only the type (1) and (2) processes described above, and there has been no previous effort to overturn these concepts and devise a totally new approach. This invention does take a completely new approach to the problem, both in photography and exhibition. It ignores many of the established concepts of what ought to be done in taking and displaying a picture, takes an approach which has not been taken before, and achieves results which have never before been attainable.

One of the well-established concepts of present-day cinematography both for narrow, wide, and very wide angle processes, is that one should secure a distortion-free image on a film, and then transfer that image, distortion-free and intact, with perhaps some horizontal anamorphosing to the screen. This concept produces a film which, while suitable for narrow and moderately wide angle processes, is totally unsuitable for very wide angle processes. However, every wide and very wide angle process known to applicant has tried to use a film taken by processes intended to produce a distortion-free film and project it distortion-free. The process of this invention deliberately makes no effort at all to photograph a distortion-free image on the film. Instead, while the image is photographed with the use of conventional, non-anamorphosing optics, it is photographed as a reflection from an inexpensive, classically simple and efficient peripheral field anamorphoser. The resulting positive print of the photographed image shows distortions all over the frame, including linear distortions on both horizontal and vertical axes, a convex horizon curvature, and a keystone shape. Not only is a distorted image produced on a film, but no attempt is made to transfer the image intact as it is on the film, because it would be a very distorted image. Neither is there any attempt made to remove the distortions in projection by conventional means, such as by passing the image through corrective lenses, except for a standard lateral deanamorphosing lens, which is itself conventional. According to this invention, the distorted image is projected as such and its distortions are cancelled for the spectator by the geometry of the system, thereby providing for an observer an undistorted image, which is obtained without using, either in photography or projection, any lenses which are not used in the conventional processes. When this system is used, the projector and spectators are located at exactly the same locations as they are in most existing large balcony theaters, and substantially the entire lower floor, and some of the balcony, are suitable for audience use. Thus the radical departure: a distorted image is photographed, and is projected without compensation of any kind other than a lateral expansion. Purely geometrical relationships in standard theaters and with the modified projection screen serve to render the previously distorted image perfect and undistorted as viewed by the observer. This constitutes a third and completely different type of very wide angle photography and projection from anything previously known. It has nothing in common with previous processes, except that they all use some kind of camera, projector, and film.

An object of this invention is therefore to provide a very wide field process which is able to be utilized in existing theaters using existing equipment, and without substantial modification or limitation in size of audience viewing areas. The results are striking when compared to results attainable with conventional very wide angle processes. In the latter, the size of the audience must be greatly cut down, not only because of the small area within which an effective illusion can be attained, but also due to the necessity of placing additional equipment in the theater, which itself takes up a great deal of space. The economic consequences are self-evident.

The photographing of the image on the film in this process is carried out with a conventional motion picture camera which photographs the image of the field as a reflection from a peripheral-field anamorphosing mirror, with the principal axis of the camera disposed at an oblique angle to the mirror. The anamorphosing mirror is a modified fragment of a cone.

A preferred but optional feature of the invention resides in placing a plano-cylinder element just ahead of the prime lens of the camera so that the sagittal and tangential images formed by the anamorphosing mirror will lie in planes that are closer to each other than they otherwise would.

The projection of the image is carried out by projecting the image downward and obliquely upon a concavely curved screen, whereby that image, when viewed from below the center of the screen appears to an observer to reconstitute the original external field.

The above and other features of this invention will be fully understood from the following detailed description and the accompanying drawings, in which:

FIG. 1 is a side elevation showing a photographic system according to the invention;

FIG. 2 is a side elevation of a portion of FIG. 1;

FIG. 3 is a right-hand elevation of FIG. 2;

FIG. 4 is a top view taken at line 4—4 of FIG. 3;

FIG. 5 is a top view taken at line 5—5 of FIG. 1;

FIG. 6 is a top view of a screen upon which an image taken by the system of FIG. 1 is projected;

FIG. 7 shows the preferred geometrical relationship between an observer, a screen, and a projector, and is taken at line 7—7 of FIG. 6;

FIG. 8 is a right-hand elevation taken at line 8—8 of FIG. 7;

FIG. 9 is a plan view of a frame of film showing how a rectangular grid appears on the film taken with the system of FIG. 1;

FIG. 10 shows the appearance of the screen of FIG. 6 with the grid of FIG. 9 projected thereon as viewed by a spectator; and FIG. 11 shows the screen of FIG. 10 as "seen" by the projection lens.

In FIG. 1, there is shown a photographic device according to the invention, which is supported by a tripod 20. A table 21 is swivelly and tiltably mounted to the tripod, and is manipulable by handle 22. A conventional motion picture camera 23 with its lenses 24 is mounted to the table. A planocylinder element 25 is mounted ahead of the camera. The planar face 26 of element 25 is normal to the camera's central axis 27.

The camera's central axis is directed toward, and fixed relative to, an anamorphosing mirror 28 (sometimes called a "peripheral-field anamorphoser"). This mirror is made of a flexible rectangular sheet of uniform thickness, and tends to assume a specific contour as a function of the lengths of its upper and lower chords when its side edges remain straight and unbent. The contour of the sheet is developed by applying lateral force at the side edges 29, 30 of the sheet. Top and bottom edges 31, 32 are unrestrained. The side edges are not bent, but are held straight, so that there is no crowning in "vertical" planes, a "vertical" plane being defined as one which is normal to the table, such as the plane of FIG. 1. Such a plane is also vertical with respect to the frame of camera 23.

The mirror is shaped and supported in a frame 33 which is mounted to the table by hinges 34 and held in an adjusted angular position relative to the table by links 35. The frame includes lateral compressors 36, 37, the compressors including upper screw means 38, 39 and lower screw means 40, 41 for exerting lateral force on the sheet. The compressor may have pads 42 of a cushioning material, such as foam rubber, to protect the edges of the sheet and prevent "crowning" of these edges. The compressors can be adjusted by appropriate turning of the screws, thereby adjusting the upper and lower chord lengths 43, 44, respectively.

A suitable material for the mirror is a sheet of optically flat plastic sold under the trademark Plexiglas, which is thick enough to hold a shape and thin enough to be bent to one. The thickness which has tested our best is 0.060 inch. It is necessary to hold the thickness to a very close tolerance. Irregularities in thickness will result in ripples and discontinuities when the sheet is bent, whereas a smoothly curved mirror is needed. The first surface of the sheet is reflectively coated. Coating the first surface eliminates multiple reflection problems.

By appropriately selecting the chord length for the top and bottom edges of a rectangular sheet, its geometrical properties can be selected and determined. For example, a suitable mirror can be made from a sheet 30 inches wide and 20 inches tall. The compressors bow out the upper edge by reducing upper chord length 43 to 28¾ inches, and lower chord length 44 to 27¾ inches.

It is theorized that the upper and lower edges of the curved mirror are elliptical arcs, and that the surface is a fragment of a cone. The surface is curved laterally, the upper and lower edges being bowed outwardly. Because there is no vertical compression on the sheet, there is no crowning in the vertical dimension. Thus it appears that the surface is generated by straight-line generators guided by the upper and lower edges as directrices. Both directrices are curved, and their curvature is preferably different, the radius curvature of the lower edge being the lesser. The mirror has a plane of symmetry which is the plane of FIG. 1.

In FIG. 3, a number of lines have been drawn indicating different positions of the generator. A "fan" pattern is formed. In defining the preferred surface as a fragment of a cone, the geometrical term which most closely describes the actual shape has been disclosed. It is believed that the surface actually is a true cone. However, the term "cone" is intended to include the structure actually formed by the above technique of bending the sheet, as well as a true cone, should there be any differences in contour.

The camera axis 27 makes an acute angle $\theta$, ordinarily about 18°+4° with the normal 45 to the mirror at the point of intersection of the axis and the mirror, as does the principal ray 46 from image 47 whose reflection coincides with axis 27. The ray, normal and axis all lie in the plane of FIG. 1.

Any camera with a rectangular frame, looking obliquely at a field, will obtain a keystoned image, due to the perspective effect. This effect is often a drawback in motion picture presentation. However, in this invention, advantage is taken of the keystoning effect. The chord length of mirror surface (and the arc length) viewed laterally in a frame of constant width increases from the bottom to the top of the frame. However, and this is most important to the invention, the number of degrees of central arc subtended by a given chord or length of arc decreases from bottom to top. The mirror is so contoured, and the camera is so disposed relative to it that, while the arc length increases, and the number of degrees per unit of arc length decreases, the number of degrees of arc subtended by the frame is sensibly constant from top to bottom of the frame. Thus vertical lines in an image tend to coincide with generators of the mirror surface, and the result is that a rectangular field is registered on the film, although not as a rectangle. It appears rectangular to the observer when projected, however. The result of this arrangement is that the lateral compression at all elevations from top to bottom of the frame is substantially constant.

There is a fortuitous effect at sides 29 and 30 of the mirror. A consistent problem with prime lenses is their tendency to stretch the image at its edges, thereby producing a region which is distorted and sometimes must be masked off. The mirror in this invention is an afocal attachment which by its properties tends to give a small additional squeeze to the image at the edges. When projected through a lens which tends to stretch the image in the edge regions, the extra squeeze is compensated for. There is also some further stretch in projection by virtue of the projector being off or beyond the screen's radius. As a result, a good image results at the edges. The small squeeze at the edge is the sole exception to the constant compression all over the field which is provided by this system.

Suitable specifications for a 35-millimeter camera system according to FIG. 1 are as follows:

Anamorphosing mirror 30 inches wide x 20 inches tall (when flat).

Upper chord 28¾ inches; lower chord 27¾ inches (bent).

Prime lens (entrance pupil) to anamorphosing mirror, measured along central axis: 12½ inches.

Angle $\theta$: 18°±4°.

Camera lens: 18-mm. wide-angle lens for 35-mm. camera.

Plano-cylindrical element: +2.75 diopters.

A frame 50 from a strip of film 51 whose image was obtained by the system of FIG. 1, is shown in FIG. 9. This figure shows the picture made on the film from a rectangular grid. It will be noted that on the film, vertical grid lines 52 are slightly fanned out, while the horizontal grid lines 53 are curves (probably not circular). The radii of curvature of the lower horizontal lines are somewhat less than the radii of curvature of the upper lines. Thus it will be noted that in the grid as it finally reaches the film, there is slight keystoning or spreading apart of lines which were vertical in the field. There is no anamorphosing or other distortion along the individual vertical grid lines (although there is "shear" displacement between successive grid lines). There is a substantial amount of anamorphosing in the horizontal dimension.

A screen 54 upon which the film of FIG. 9 may be projected to create the desired illusion is shown in FIG. 6. Its surface 55 may be geometrically described as a curved surface developed by a generator maintained normal to the plane of FIG. 6 (vertical relative to an observer) and guided by line 56 in FIG. 6 as a directrix. A set of coordinates for a suitable demonstration screen to project a 35-millimeter film taken by the device of FIG. 1 is as follows:

| Point     | A | B    | C    | D    | E  | F    | G    | H    | I  |
|-----------|---|------|------|------|----|------|------|------|----|
| X (feet)  | 0 | 9    | 18   | 27   | 36 | 45   | 54   | 63   | 72 |
| Y (feet)  | 0 | 10½  | 17⅝  | 21¾  | 23 | 21¾  | 17⅝  | 10½  | 0  |

Related dimensions are: Screen height, 26 feet.

Range of elevations of observer's eye relative to bottom edge of screen for satisfactory illusion: 6 feet below (preferred) to 13 feet above (that is, about the middle of the screen).

Distance of observer from chord AI of screen: 0 feet to 144 feet (about 12 feet preferred).

Included angle between principal rays 60, 61 from projections lens 62 to screen and screen to eye 63: 36°±8°.

Projection lens horizontal distance from center of screen: 153 feet.

Projection lens vertical distance from mid-point of screen: 36 feet.

Anamorphic attachment at projection lens: 2x decompression (lateral).

In setting up the screen, it is first shaped to a smooth curve fitting the above coordinates. It will be found that over most of the screen area, the grid pattern on the film (FIG. 9) when projected will be seen as a rectangular pattern by a properly located observer on the screen shaped in this manner. However, some regions, such as those at the sides, may require a little "flattening." Arcs AB and HI, for example, sometimes provide better imagery if they have slightly less curvature than the other arc segments. The precise shape is made by bending the regions where distortions appear until the grid looks rectangular. Ordinarily, only arcs AB and HI require such special shaping.

Screen 54 as "seen" by the projection lens is shown in FIG. 11. Its bottom portion is perceived by the lens to be more sharply curved than the upper portion, because of the angles and distances involved. The two edges appear to draw together toward the bottom of the screen, and appear to be farther apart at the top. It is upon a surface which appears to the projector as shown in FIG. 11, that the film of FIG. 9 is projected.

The appearance of the same screen 54 to the observer is shown in FIG. 10. When the observer is located outwardly from chord AI, and about even with the bottom edge of the screen, the bottom edge appears to be substantially a straight line, and the upper edge appears to be a sharp upwardly-open curve. The side edges appear to approach each other toward the top of the screen. It will be noted that, while the screen as seen by the projector and an observer in FIGS. 11 and 10, respectively, are not precisely mirror images, they are generally reciprocal.

Dashed line 64 illustrates the outline of a grid on the film as seen by the observer when projected as shown. To the observer, the grid is restored to its rectangular shape, so that any scene is recreated on a screen in its true dimensions and perspective. The grid lines in FIGS. 9 and 10 are not necessarily the same lines.

The rectangular image included within dashed line 64 may subtend an angle as great as 180°. Observers over a wide area of the main floor of a theater will receive a very satisfying illusion of reality from this arrangement. The preferred locations, of course, are at center, near the bottom of the screen and looking up, for as the elevation of the projector is approached, horizontal lines in the picture begin to assume slight curvatures.

The design considerations in the above system are as follows: The anamorphosing mirror is so shaped and disposed relative to the camera that the lateral field of the frame of the camera includes a substantially constant number of subtended degrees of arc on the mirror at all elevations in the frame. The screen is so shaped, and the projector is so disposed relative to the screen, that lines which were vertical in the photographed field are, when projected onto the screen, seen as vertical lines by observers within the viewing area. The system is simple, utilizing nothing which is not used in conventional systems, except for the specially shaped screen and the specially shaped mirror, both of which are classical in their simplicity. As heretofore stated, a standard lateral deanamorphosing lens is placed in the projection system.

A comparison of the film of FIG. 9 and the area enclosed within dashed line 64 in FIG. 10 shows that the dashed areas 65 on the film are not utilized for audience presentation. This part of the film is therefore not utilized. However, the non-utilized portion represents less than one-sixth of the total frame area, and this is in considerable contrast with other techniques whose aspect ratio is approximately the same. When film from conventional anamorphosing processes is utilized in standard projectors, for example, almost one-half of the film cannot be utilized. Thus, in conventional processes, the same information needs to be recorded on an area of film much smaller than that on which the same data is recorded in the present invention. It is evident that when the same amount of information can be recorded on a greater area of film, that the resolution and clarity of the picture can be profoundly improved. The presently-preferred aspect ratios are between lateral and vertical dimensions, and lie between 2:1 and 3:1. The aspect ratio of the described system is 2.9:1.

This system is adaptable to film of any width, including 70-millimeter and larger, being without limitation in that regard. Also, systems of greater or lesser dimensions than those described above can be utilized, and their dimensions can be derived from the above data.

The plano-cylinder element 25 is used principally to overcome astigmatic effects which arise because of the necessity of dealing with two focal lengths resulting from using the reflection from a curved anamorphosing mirror. It will be recognized that the image-forming properties in the laterally curved dimension of the mirror will be different from those in the uncurved vertical dimension; that is, the sagittal and tangential imagery are formed at different locations in space. The plano-cylinder element sufficiently overcomes this effect by bringing the images into close enough coincidence that the phenomenom is of no practical importance. Astigmatic effects are further avoided by the fact that the compression ratio from this mirror is constant from top to bottom due to the aforesaid substantial constancy of the number of subtended degrees of arc on the mirror from top to bottom.

A further advantage of this process is that the screen is curved less than in many very wide angle processes. By utilizing a screen of lesser curvature, there is less distortion to the viewers who are positioned off the best viewing positions. Also, it is found that there is less cross-illumination which, of course, improves the overall image as presented.

In FIG. 9, lines 53 show a convex horizon curvature. This is a compensation for the phenomenom known as "horizon sag" which is found in many or most conventional processes. Because of this compensation, the horizon lines are flat and level as viewed by the observers which constitutes another advantage over the illusion presented by the presently-known processes.

With respect to the quality of the image, comparisons have been made with the Standard of the Motion Picture Research Council. As to spherical aberrations, this process meets or exceeds these standards so long as the camera is maintained on axis with the mirror. Such small spherical aberrations as may arise in this system are much less noticeable than in conventional very wide angle systems.

As to chromatic aberrations, no chromatic aberrations arise at all from the use of the mirror, and because this invention uses a standard prime lens, any chromatic aberrations which arise there are no different from those which arise in any other system using similar lenses. Therefore, this process is at least up to standard with respect to chromatic aberrations.

With respect to astigmatisms, because there is a relatively short focal length involved, astigmatism is not a very serious problem. There is some astigmatism at larger apertures, but with the use of the plano-cylindrical element it is found that the resulting image is well within acceptable limits.

With respect to comatic aberrations, it has been found that comatic problems may arise if lateral anamorphosing is utilized with much more than 2x lateral expansion. However, with lateral expansion of 2x, comatic aberrations have been found uniformly to be within commercially acceptable standards. Mirror systems tend to have inherent within them comatic aberrations and this system is no exception; however, these aberrations are not important with the lateral anamorphosing range where the system will ordinarily be utilized.

Resolution tests have indicated that better than 40 lines per millimeter of resolution can be maintained, even in the margins of the field, which equals or exceeds standard commercially acceptable tolerances.

The preferred viewer locations are as follows: The viewer should be no closer to the screen than chord AI, and should be disposed below the center of the screen, and preferably no farther back than 2 times the chord length AI, from said chord.

This invention provides for the first time to audiences over a large viewing area a peripheral field which is undistorted for them. It permits for the first time the display of closeups of faces and other objects, which could not be done with conventional processes. Scrips for very wide angle processes can now be written to include such shots. Furthermore, this system can be utilized without modification of most existing theaters, except, of course, for providing a new screen. All of these results are attained by virtue of having taken a completely new approach to the field of cinematography, and has resulted in a completely new type of photography and projection which is economically sound and esthetically desirable.

While the invention has been described with respect to its principal usage, that is, cinematography, it is also useful in television displays, training simulators, and the like. Its usefulness is not limited to illuminated film processes, nor to motion picture processes, but is applicable to all illuminated projected processes and their applications.

This invention is not to be limited by the embodiment shown in the drawings and described in the description which is given by way of example and not of limitation, but only in accordance with the scope of the appended claims.

I claim:

1. A process for photographing a very wide angle field, including the central and peripheral portions thereof, and projecting the same on a screen to reconstitute the field on the screen, comprising: photographing the field using a mirror having a reflecting surface with a plane of symmetry and also having a longitudinal axis and a camera having a central axis directed toward the mirror, and having its central axis lying in said plane of symmetry and being non-perpendicular to the intersection of the plane of symmetry and the reflecting surface, and also being non-parallel to said longitudinal axis, said mirror being a curved surface generated by a straight-line generator and having an increasing radius of curvature from bottom to top relative to the camera frame, and projecting with a projector the image obtained from said photographic operation upon a screen, said screen being a concave, substantially continuous curved surface developed by a vertical straight-line generator, said projector projecting the image at a downward angle to the screen so that an observer located below the middle elevation of the image as projected on the screen perceives the projected image with its rectilinear dimensions substantially oriented along their respective apparent axes in the observer's field.

2. A process according to claim 1 in which the camera's axis is so directed at the mirror, and the curvature of the mirror is such, that the lateral dimensions in the camera's frame subtend equal angles of arc on the surface of the mirror from top to bottom of the frame.

3. A process according to claim 2 in which the mirror is a fragment of a cone.

4. A process according to claim 2 in which a plano-cylindrical element having a cylindrical axis is so disposed and arranged that its cylindrical axis perpendicularly intersects the central axis of the camera, said cylindrical axis being aligned with the bottom-to-top orientation relative to the camera frame.

5. A camera system for photographing a very wide angle field, including the central and peripheral portions thereof, comprising a camera having a central axis, and a peripheral field anamorphosing mirror mounted to the camera and spaced therefrom, said mirror being a curved reflective surface generated by a straight-line generator guided by arcuate directrices and having an increasing radius of curvature from its bottom to its top relative to the frame of the camera, said mirror having a reflective surface, said reflective surface having a plane of symmetry and also having a longitudinal axis, comprising a reflectively coated, uniformly thick, flexible, rectangular sheet of springy material having top, bottom, and side edges, the shape of the mirror being developed by exertion of opposed inward forces on the side edges, no opposed forces being exerted on the top and bottom edges, the opposed forces being greater where the radius of curvature is lesser, whereby the camera frame subtends in a lateral direction equal arcs on the mirror from the top to the bottom of the frame, the central axis of the camera lying in the plane of symmetry and being non-perpendicular to the intersection of the plane of symmetry and reflecting surface and also being non-parallel to said longitudinal axis.

6. A camera system according to claim 5 in which a plano-cylindrical element is mounted to the camera on its central axis with the cylindrical portion disposed vertically relative to the frame.

References Cited in the file of this patent

UNITED STATES PATENTS

| | | |
|---|---|---|
| 713,643 | Jackson | Nov. 18, 1902 |
| 1,259,711 | Allison | Mar. 19, 1918 |
| 2,017,634 | Newcomer | Oct. 15, 1935 |
| 2,129,513 | Wegener | Sept. 6, 1938 |
| 2,216,512 | Fetter | Oct. 1, 1940 |
| 2,792,746 | O'Brien | May 21, 1957 |

FOREIGN PATENTS

| | | |
|---|---|---|
| 704,471 | France | Feb. 23, 1931 |

UNITED STATES PATENT OFFICE
CERTIFICATE OF CORRECTION

Patent No. 3,142,223　　　　　　　　　　　　July 28, 1964

Richard H. Vetter

It is hereby certified that error appears in the above numbered patent requiring correction and that the said Letters Patent should read as corrected below.

Column 4, line 38, for "18°+4°" read -- 18°±4° --.

Signed and sealed this 20th day of April 1965.

(SEAL)
Attest:

ERNEST W. SWIDER
Attesting Officer

EDWARD J. BRENNER
Commissioner of Patents